Figure 1:
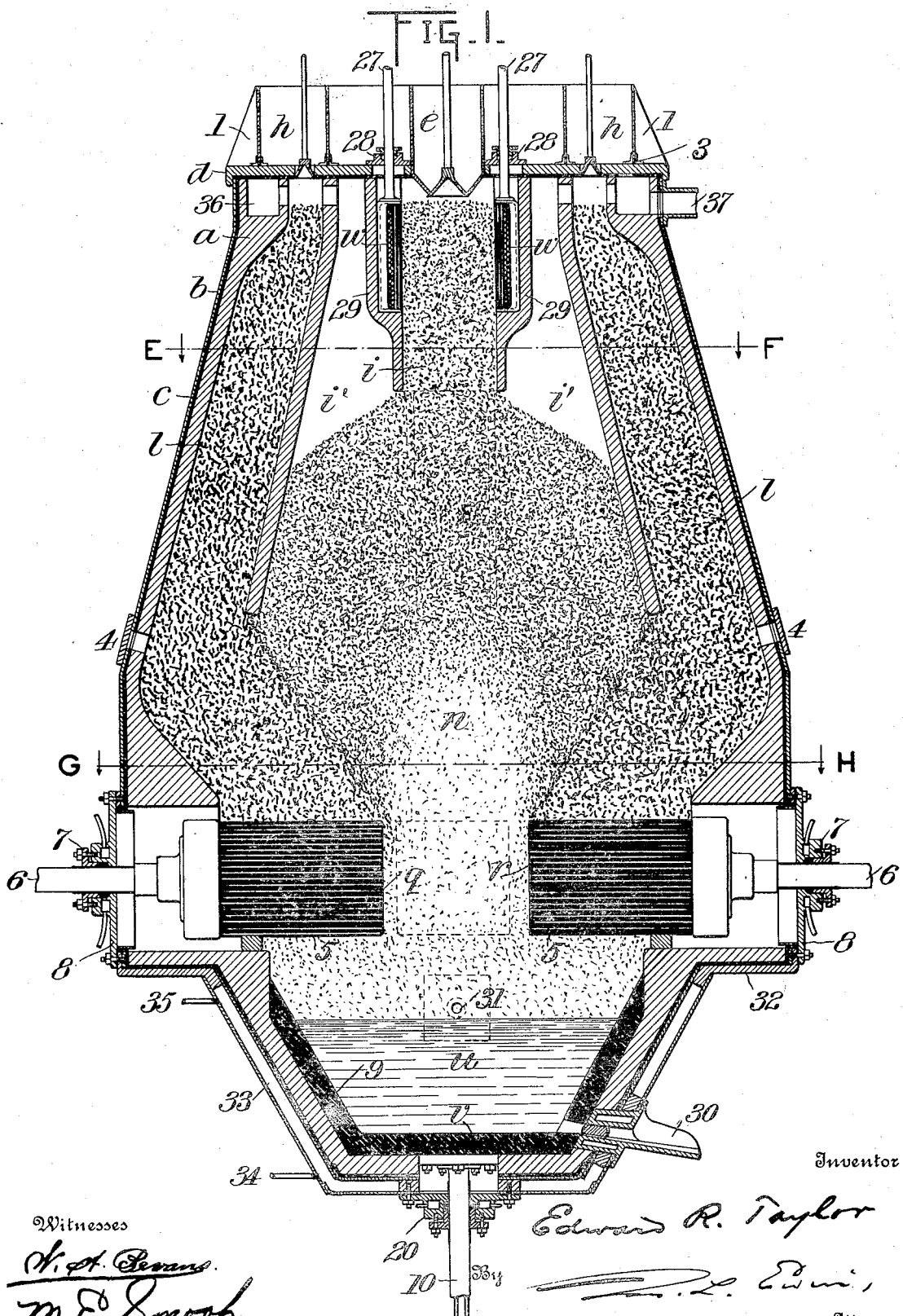

E. R. TAYLOR.
ELECTRIC SMELTING FURNACE.
APPLICATION FILED JUNE 12, 1908.

938,351.

Patented Oct. 26, 1909.
10 SHEETS—SHEET 1.

Witnesses

Inventor
Edward R. Taylor
By
Attorney.

E. R. TAYLOR.
ELECTRIC SMELTING FURNACE.
APPLICATION FILED JUNE 12, 1908.

938,351.

Patented Oct. 26, 1909.
10 SHEETS—SHEET 4.

Witnesses
W. A. Evans
M. E. Smoot

Inventor
Edward R. Taylor
By
Attorney.

E. R. TAYLOR.
ELECTRIC SMELTING FURNACE.
APPLICATION FILED JUNE 12, 1908.

938,351.

Patented Oct. 26, 1909.
10 SHEETS—SHEET 5.

Witnesses
Inventor
Edward R. Taylor
Attorney

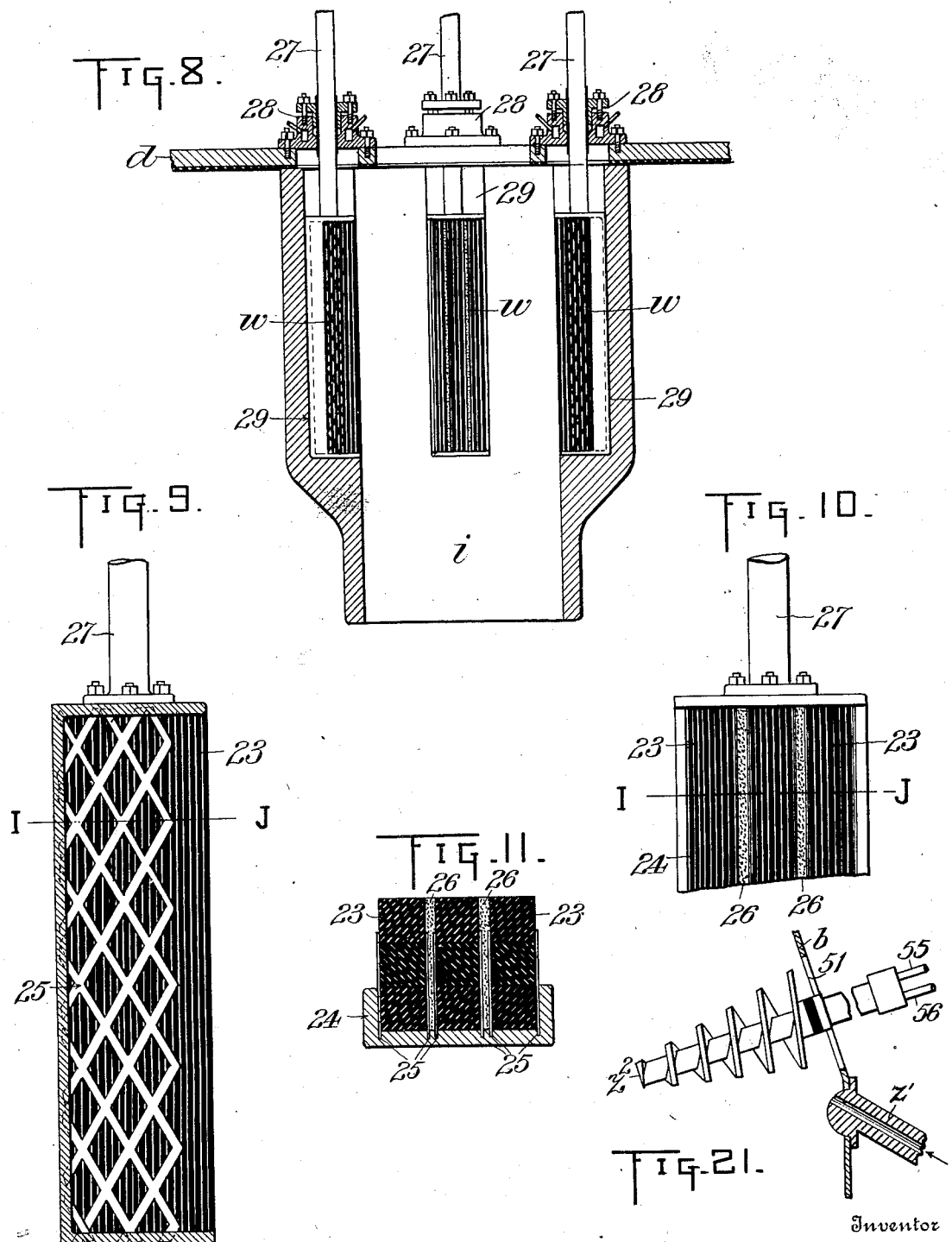

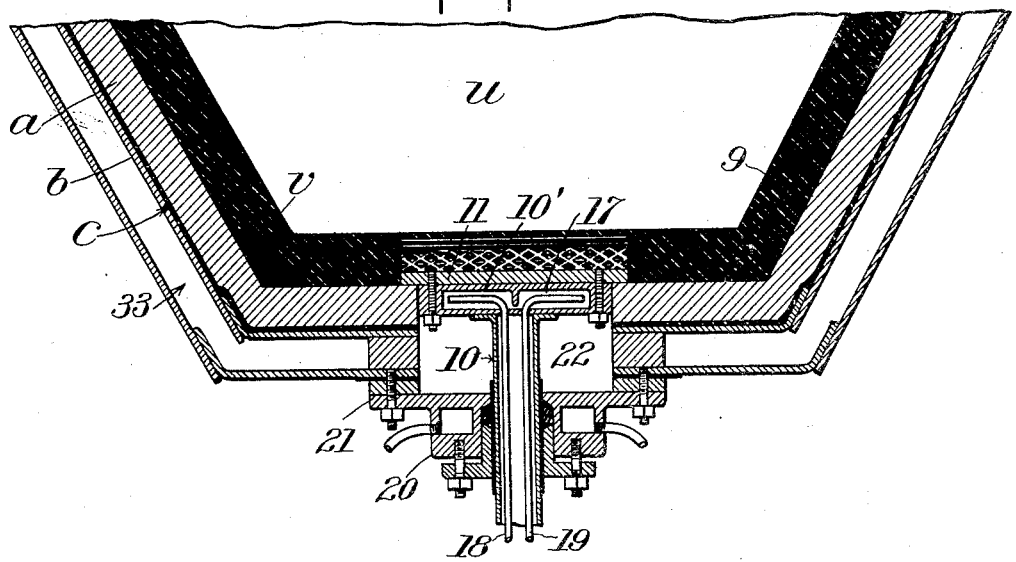
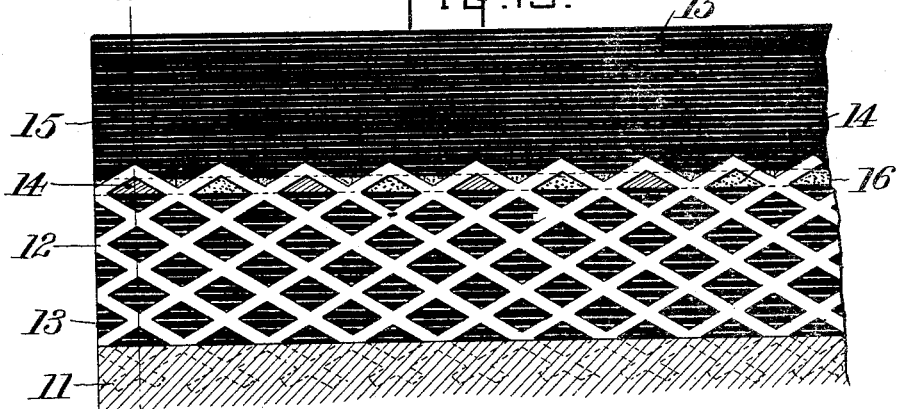
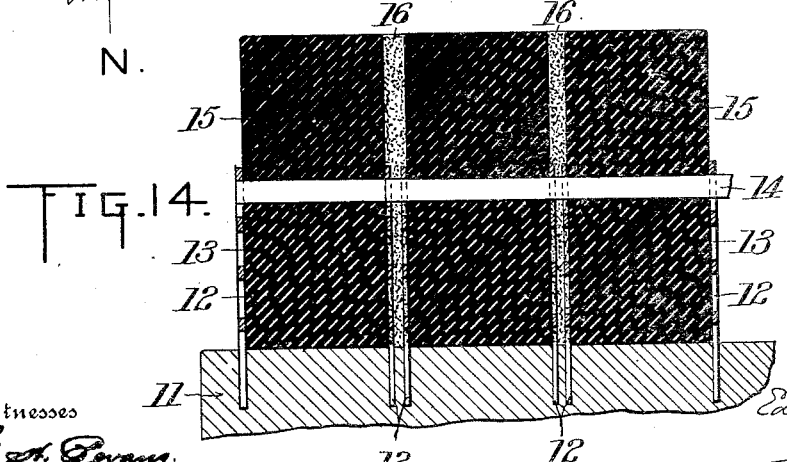

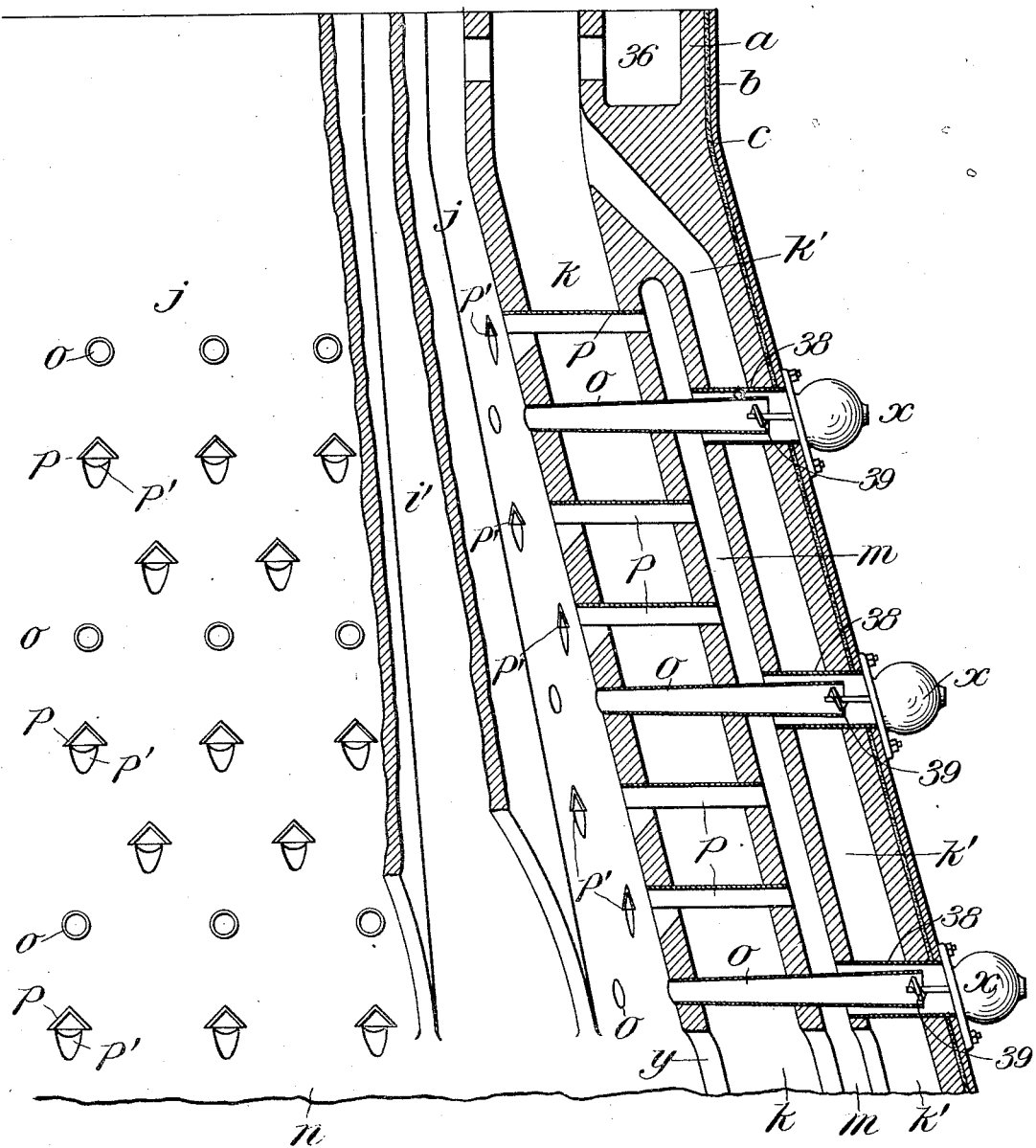

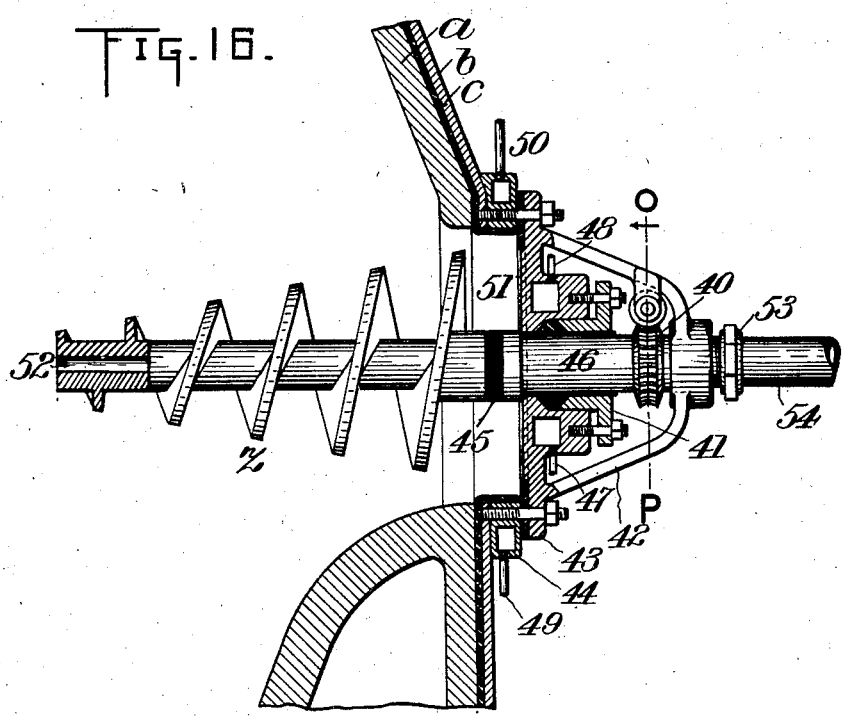
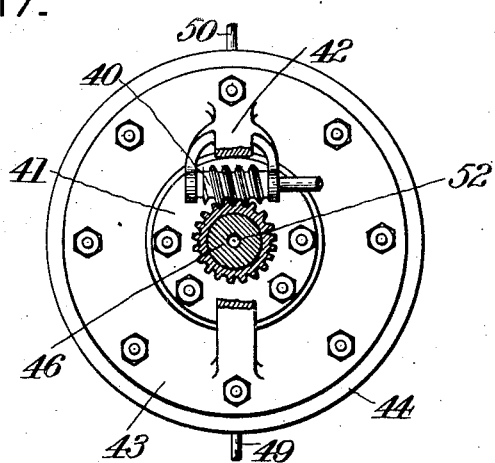

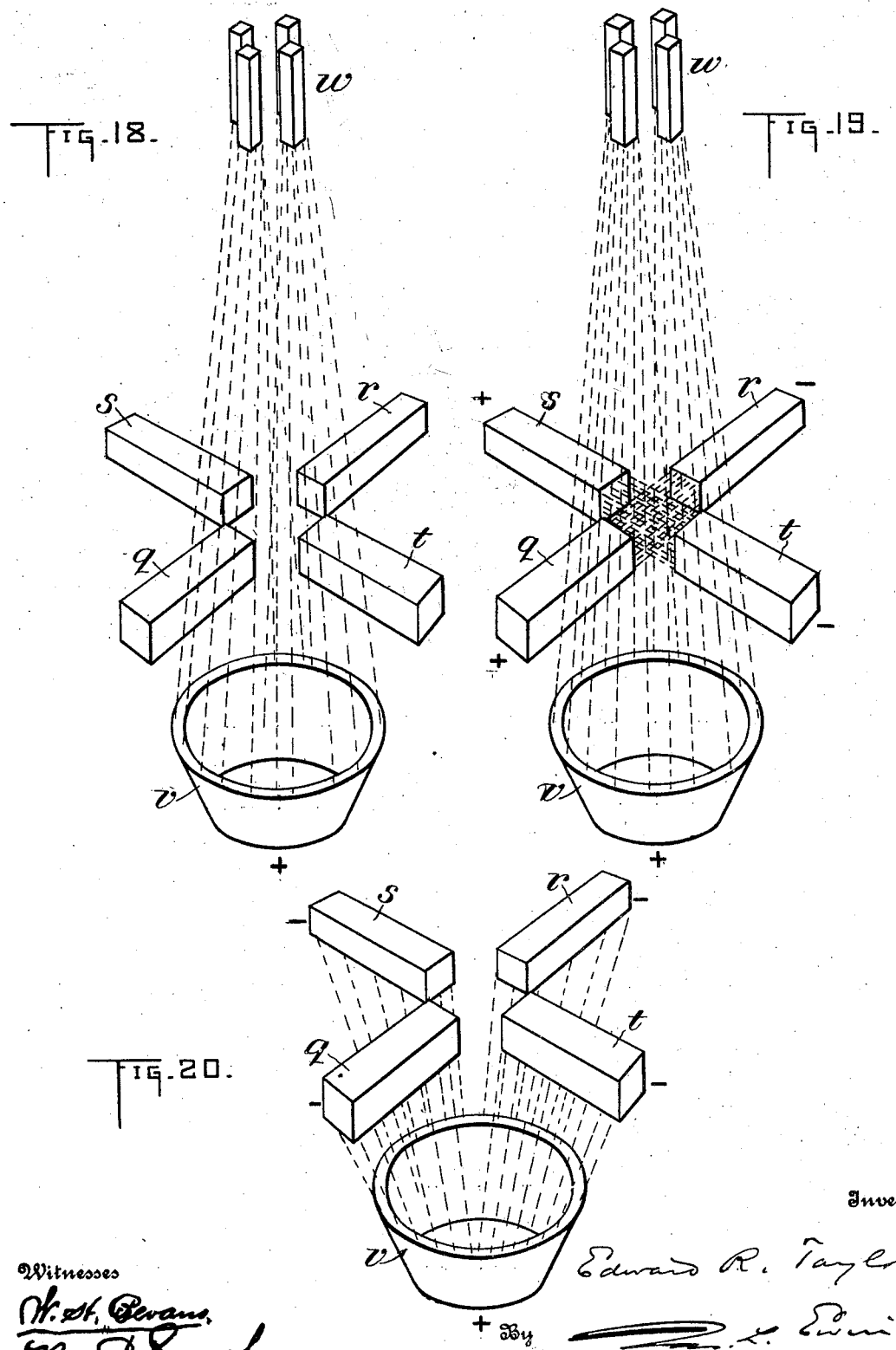

UNITED STATES PATENT OFFICE.

EDWARD R. TAYLOR, OF PENN YAN, NEW YORK.

ELECTRIC SMELTING-FURNACE.

938,351.

Specification of Letters Patent.   Patented Oct. 26, 1909.

Application filed June 12, 1908. Serial No. 438,115.

*To all whom it may concern:*

Be it known that I, EDWARD R. TAYLOR, a citizen of the United States of America, and a resident of Penn Yan, in the State of New York, have invented a new and useful Improvement in Electric Smelting-Furnaces, of which the following is a specification.

This invention relates primarily to the electric smelting of oxid iron ores by a continuous process; but the improved electric furnace, and novel features thereof, may be used for effecting other reactions and reductions.

The present invention consists in the improved electric furnace hereinafter described, and certain novel features thereof, as more particularly set forth in the claims hereto appended.

The invention is in part additional to the "Improvement in electric furnaces" set forth in my specification forming part of United States Letters Patent No. 688,364, dated December 10, 1901.

The objects of the present invention common thereto and to said patented improvement, include the protection of horizontal or substantially horizontal electrodes against excessive wear, and the regulation of the electric action within the furnace by means of fragmentary conducting or resistance regulating material, fed by gravity upon said electrodes and between the same; the prevention of the leakage of electricity, with reference to securing the maximum heating or electrochemical effect of the current; the cooling of the electric conductors or electrode stems; the interception and utilization to the utmost of heat that would otherwise be lost by radiation; and the avoidance of the cooling of the more highly heated inner part of the furnace or heat zone, in continuous reactions and reductions, by the sudden introduction of cold material, so as to insure the continuity of the operation.

Other objects common to said patented improvement and the present invention are to utilize in an effective manner the alternating or two-phase electric current, and to provide for varying the paths of the electricity through the charge within the working chamber so as to prevent the formation of piers of the less fusible ingredients of the charge or to burn out such piers should they accidentally be formed.

Other objects, including most of those hereinafter stated, are common to the present improvement and to a companion improvement in the "Art of electric smelting" more particularly described and claimed in a companion specification forming part of a divisional application for patent filed March 3, 1909, Serial No. 481,121.

The leading object is to overcome certain difficulties that present themselves in the electric smelting of metals and other electrically conductive materials in a shaft furnace, and especially to keep the material of the charge between the electrodes from becoming so conductive of electricity as to reduce the resistance of the furnace below practicable working limits.

Other objects are the separation of the ore in the four quarters of a two-phase furnace having two pairs of horizontal or inclined main electrodes, hereinafter referred to in common as "horizontal", arranged in vertical planes at right angles to each other, so as to keep the same separate, and thus to facilitate the manipulation of the ore within the furnace; to provide for employing a large proportion of fine ore, such as cannot be smelted in a blast furnace because of its liability to be blown out of the furnace by the blast; to provide for feeding fine and coarse ore downward in a stack furnace in separate vertical or substantially vertical columns; to utilize a portion of the charge and especially the fine ore columns for the conservation of the heat of the furnace, by feeding the same downward at or near the periphery of the furnace to a suitable point above horizontal main electrodes, and there feeding the same inward by a stoking operation to so regulate the feed of such material as to properly utilize the energy liberated between the main electrodes without causing short circuits; to provide for admitting successive small quantities of fine ore into the outer edges of the coarse ore columns in order to gradually bring the hottest of the fine ore in toward the center of the furnace, and to relieve the stress of stoking to that extent; to provide for feeding suitable carbonaceous material, preferably either coke or charcoal, in a central column, and for utilizing lateral wings of such "coke column", as it is hereinafter termed, to separate the columns of coarse ore; to utilize such coke column as a resistance conductor between secondary electrodes located at the bottom and top of the furnace respectively; to provide in this way for starting the furnace with facility by the interaction of said secondary electrodes and said coke column; to keep the carbonaceous material of the charge incandescent to a greater height than has heretofore been practicable; to vary the height of such incandescence at will; to determine thus the percentage of carbon, for example, in the reduction of iron, so as to produce pig iron or steel as may be desired; to insure the reduction of ore to metal, to as considerable an extent as may be possible, in the fine ore before it reaches the heat zone, and to utilize the heat between said horizontal electrodes for superheating the streams or globules of fluid metal as they trickle downward, so that they shall carry with them into the hearth sufficient heat to keep the metal in the hearth in a fluid condition; to provide for reheating the metal in the hearth in case of accident; and to render practicable the employment of such secondary electrodes, and especially those located at the bottom of the furnace, by internal provisions for the maintenance of an effective continuous contact between the carbon of which they are mainly composed and their metallic stem portions.

Another object is to provide for feeding inward the resistance regulating material at will, by stoking, to regulate the conductivity of the charge.

Another object is to provide, by the ore-stoking means or independently, for the introduction of oxidizing material into the center of the furnace, for the purpose of oxidizing accumulations of carbon or other oxidizable materials which may at times form to an undesirable amount and interfere with the regular working of the furnace.

Other objects peculiar to the present improvement and said companion improvement in the art of electric smelting relates especially to the production in an electric furnace of iron or steel, hereinafter referred to in common as metal, from iron ores consisting of or containing sesquioxid of iron, $Fe_2O_3$, or magnetic oxid, $Fe_3O_4$, or other forms of iron oxid adapted for like treatment. Sesquioxid of iron, for example, at a sufficient but low temperature, in contact with carbonic oxid gas also at a low but sufficiently high temperature, undergoes substantially the following reaction, that is to say:—

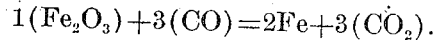
$$1(Fe_2O_3)+3(CO)=2Fe+3(CO_2).$$

In the production of iron in a blast furnace the above reaction is usually completed before the material reaches the high temperature of the fusion zone. To accomplish this reaction in the electric furnace, as heretofore constructed, has been a matter of uncertainty and difficulty; and it is one object of the present invention to furnish conditions whereby the above reaction will be accomplished in the regular order of the descent of the material from the feed hopper to the heat zone. In the first heating-up of an electric furnace of this kind, as the coke, charcoal or other carbonaceous material is brought to incandescence, by the resistance it offers to the passage of the current, any oxygen within reach will be absorbed, with the formation of carbonic acid ($CO_2$), which gas in the presence of an excess of incandescent carbon speedily becomes reduced to carbonic-oxid gas (CO); one molecule of the carbonic acid becoming two molecules of the carbonic-oxid gas. This latter gas then coming in contact with the oxid of iron, in any of its oxid forms, at a sufficiently high temperature, absorbs oxygen from the ore, with the reduction of the ore to metal, and the formation of one molecule of carbonic acid for each molecule of carbonic-oxid gas. If the carbonic acid thus formed can again be brought into contact with incandescent carbon, and the resulting carbonic oxid gas again brought into contact with iron ore, the same reactions above described will repeatedly take place; and another object of this invention is to so circulate these two gases as to repeatedly bring the carbonic oxid gas as quickly as practicable after its formation into contact with iron ore in its proximity, and afterward, as soon as possible thereafter, to bring the carbonic acid thereby produced into contact with incandescent carbon, and to repeat the cycle of these reactions until the final gas passes out of the furnace at its top.

Other objects will be set forth in the general description which follows.

Ten sheets of drawings accompany this specification as part thereof.

Figure 2:
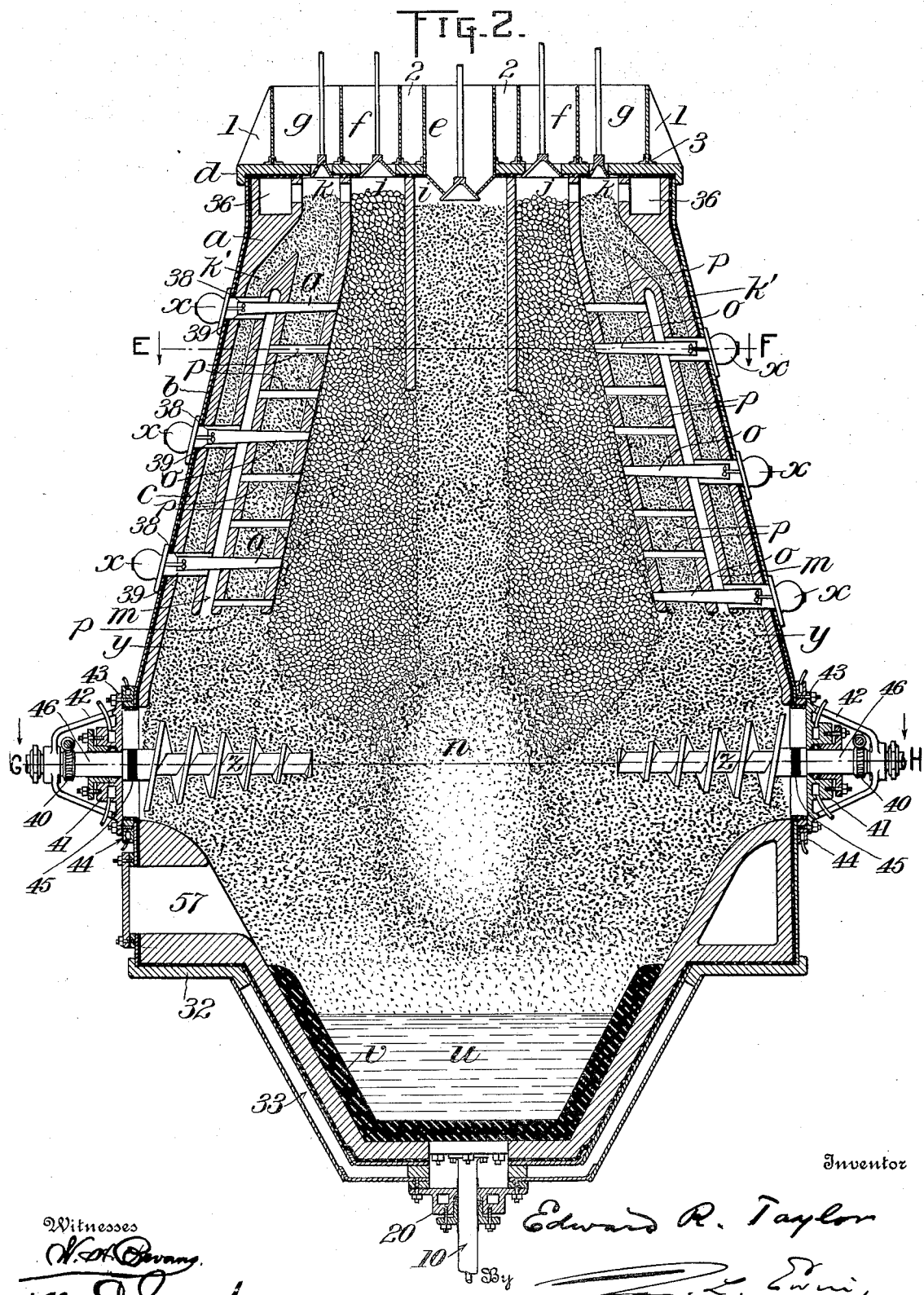
Figure 3:
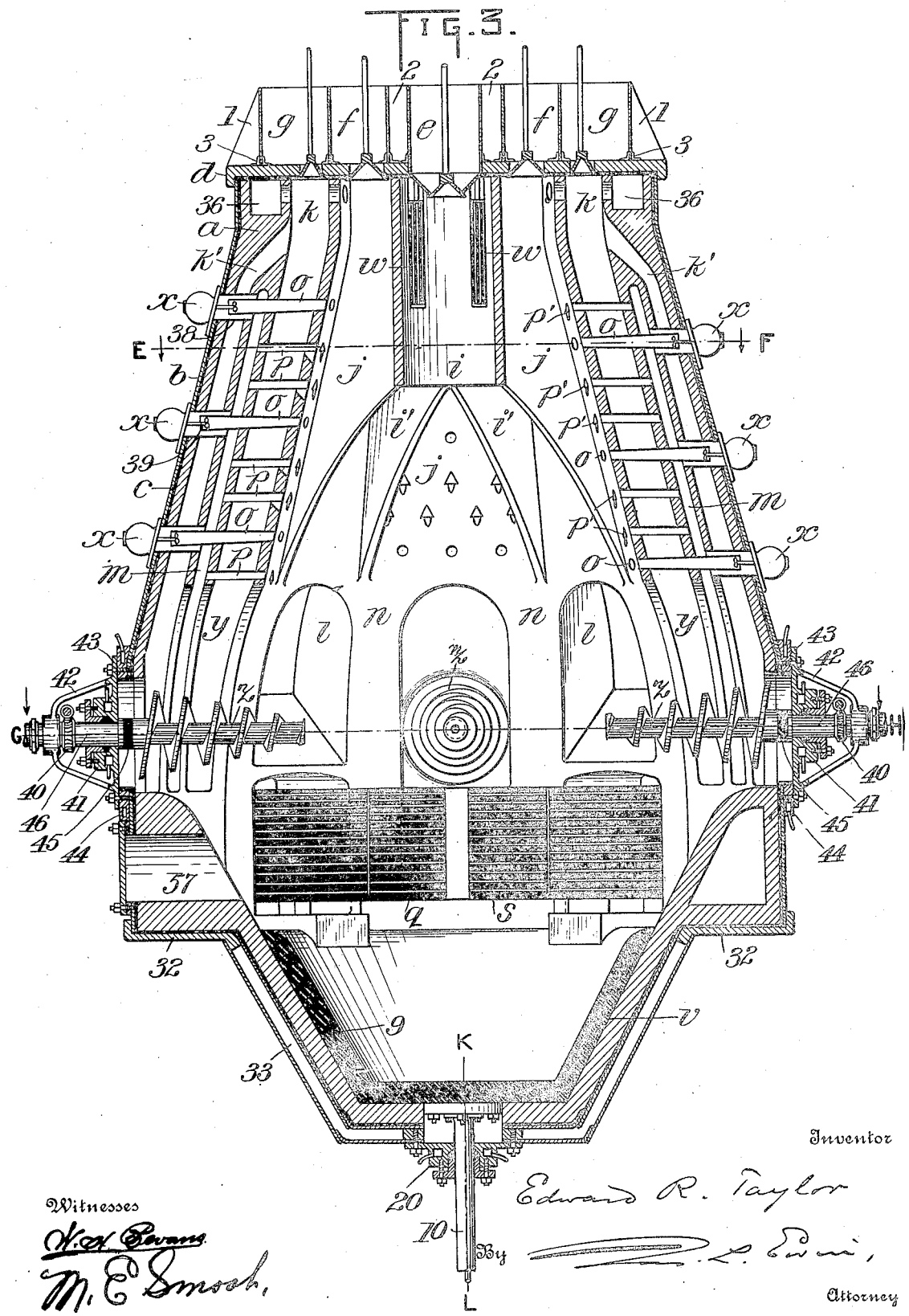
Figure 4:
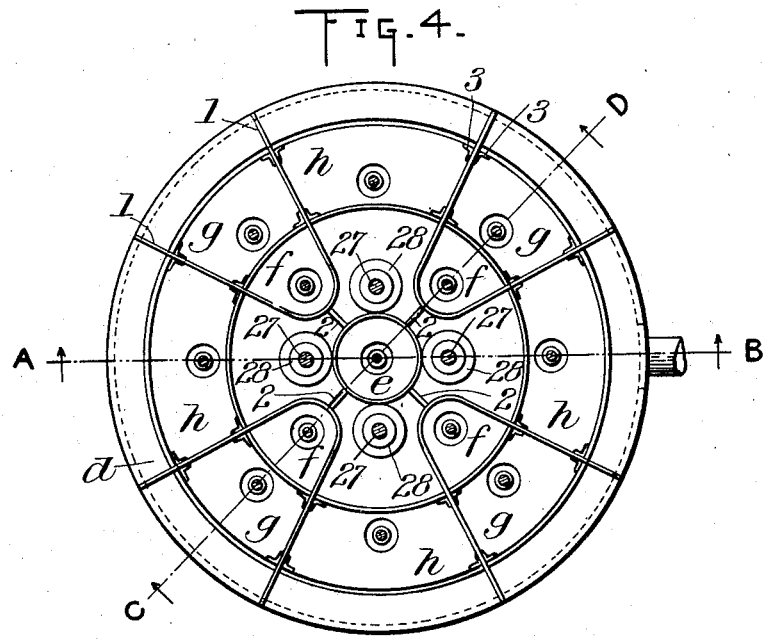
Figure 5:
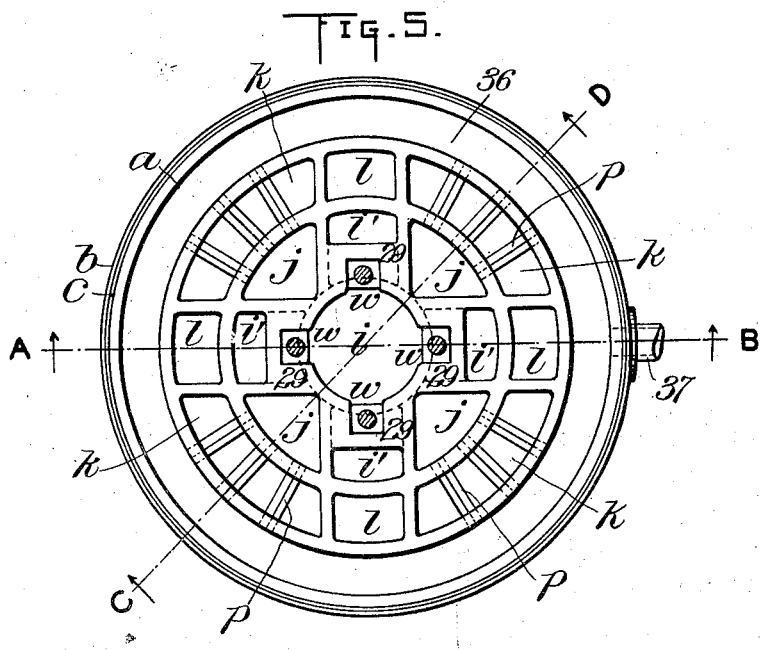
Figure 6:
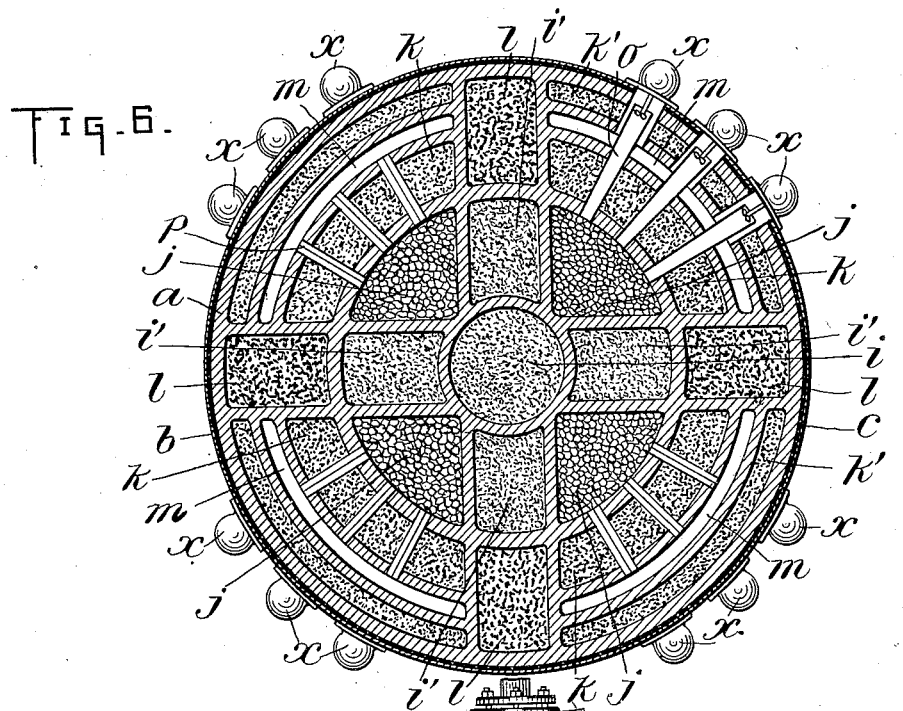
Figure 7:
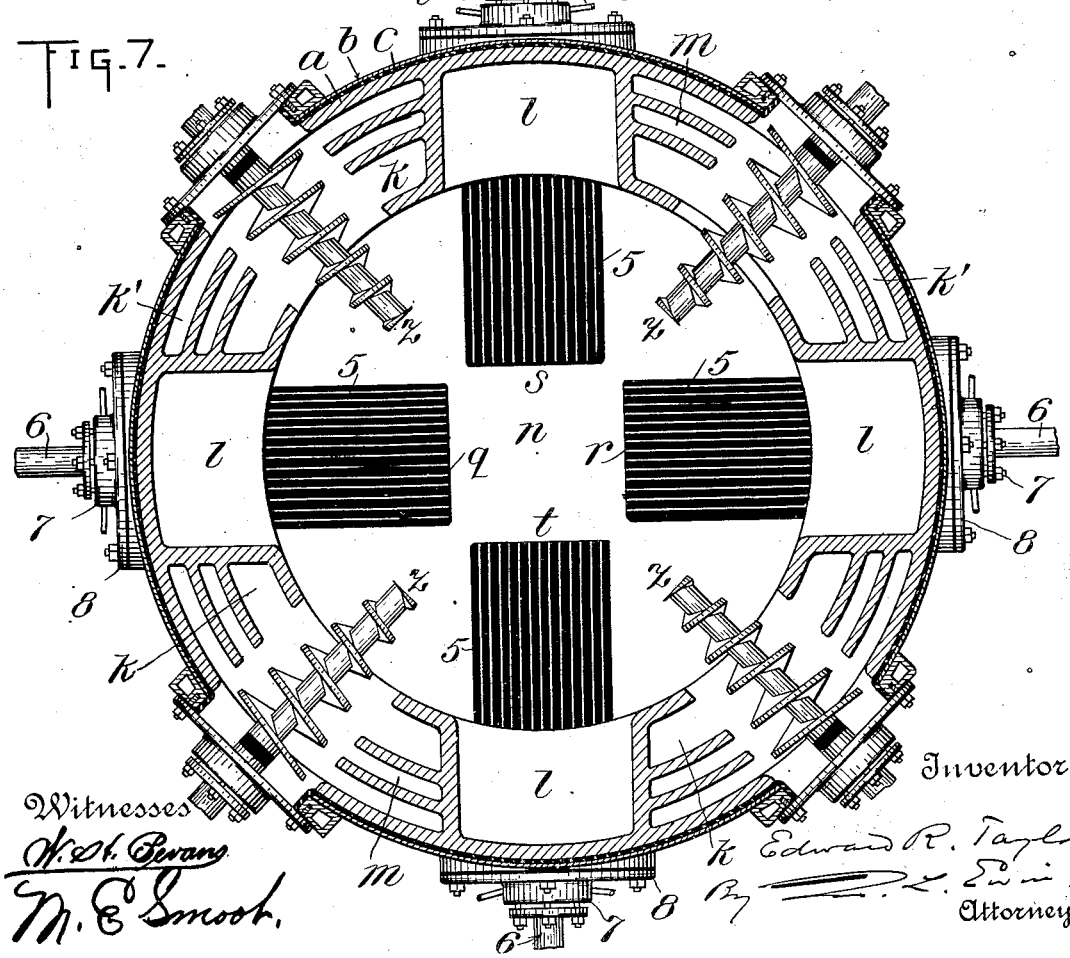

Figures 1 and 2 represent axial vertical sections in different planes through an electric smelting furnace embodying the present invention, and illustrating the smelting process; Fig. 3 represents the same vertical section as Fig. 2, showing the furnace empty; Figs. 4 and 5 are plan views respectively of the top of the furnace above and beneath its top plate, indicating by lines A—B and C—D the planes of Fig. 1 and of Figs. 2 and 3, respectively; Fig. 6 represents a horizontal section on the lines E—F, Figs. 1 and 2 and Fig. 3; Fig. 7 represents a horizontal section through the empty furnace on the lines G—H, Figs. 1, 2 and 3; Fig. 8 represents a detail view of the secondary electrodes at the top of the furnace, on a larger scale partly in section on said lines A—B, Figs. 4 and 5; Fig. 9 represents a sectional side view of one of these electrodes on a still larger scale; Fig. 10 is a fragmentary face view projected from Fig. 9; Fig. 11 represents a cross section on the lines I—J, Figs. 9 and 10; Fig. 12 represents a section on a larger scale through the secondary electrodes at the bottom of the furnace on the line K—L, Fig. 3; Fig. 13 represents a sectional enlargement of a fragment of this electrode; Fig. 14 represents a cross section on the line M—N, Fig. 13; Fig. 15 is a sectional detail view of the upper part of the furnace enlarged from Fig. 3; Fig. 16 represents a detail side view of one of the stoking screws enlarged from Fig. 3; Fig. 17 represents a face view partly in section on the line O—P, Fig. 16; Figs. 18, 19 and 20 are diagrams representing the paths of the electric current under different conditions; and Fig. 21, Sheet 6, is a fragmentary detail view illustrating a modification hereinafter described.

Like reference characters indicate like parts in all the figures.

The improved furnace is of a stack form; its internal structure, $a$, being built of suitable brick or the like within a metallic shell, $b$, of iron or steel, hereinafter referred to as iron; and a layer, $c$, of a suitable non-conductor of electricity, such as asbestos, being interposed between the internal structure $a$ and the shell $b$ throughout. The top plate, $d$, of the shell $b$ and of the furnace is conveniently horizontal, and is provided with feeding hoppers, $e$, $f$, $g$ and $h$, best shown in Fig. 4, which are so shaped and so united with each other and with the top plate by braces, stays and angle irons, represented respectively at 1, 2 and 3, as to form a truss by which the subjacent top-plate is stiffened against sagging. The respective hoppers $e$, $f$, $g$ and $h$ communicate with the upper ends of flue-shaped passages, $i$, $j$, $k$ and $l$, which extend downward within the internal structure $a$; and the hoppers $f$ and passages $j$, each of them four in number in the specific construction represented by the drawing, are appropriated to the principal charge of ore, hereinafter referred to as the coarse ore, which is thus divided into several distinct columns. Another set of said hoppers and passages, $g$ and $k$, external to said coarse-ore passages, are appropriated to fine ore, which may be of that description which is too fine for reduction in a blast furnace, and which is utilized in this arrangement, not only to feed fine ore into the charge, as hereinafter more particularly set forth, but also and primarily to conserve the heat of the furnace by intercepting and utilizing heat that would otherwise escape by radiation and by being conducted outward, and to carry the same back into the working chamber so as to protect the iron shell of the furnace against excessive heat, and to utilize such radiant or outwardly directed heat in the reduction of the ore.

The fine-ore passages $k$ are divided into inner and outer passages by hollow walls forming a gas space, $m$, Figs. 2, 3, 6, 7 and 15, within each wall, open at bottom and in direct communication with said coarse-ore passages $j$ and with the working chamber, $n$, by way of outwardly flaring gas tubes, $o$, hereinafter more particularly described. The outer fine-ore passages, marked $k'$, communicate with the working chamber at their lower ends only, and are located peripherally, as shown in Fig. 6, so that the body of fine ore within them may be as cool and as continuous as may be practicable, with reference to intercepting and utilizing outwardly directed heat. The inner fine-ore passages $k$ are provided with baffle plates, $p$, Figs. 2, etc., preferably V-shaped in cross section, and arranged with the apex uppermost so as to retard the flow of the fine ore to a sufficient extent without being subjected to breaking strains, and more particularly to form suitably distributed spaces throughout the body of fine ore. From each of these spaces an opening, $p'$, Figs. 3 and 15, extends inward through the wall of the working chamber $n$, and affords a discharge for more or less of the fine ore as it reaches that point into the outer edges of the coarse-ore columns, so as to gradually mix the two as they approach the heat zone, and to gradually bring the hottest of the fine ore inward toward the center of the furnace and thus to reduce the need of stoking.

The central hopper $e$ and the passage $i$ extending vertically therefrom are appropriated to suitable dry carbonaceous material, which may consist wholly or in part of charcoal or coke and is hereinafter referred to as coke. The coke column so formed is intended to preserve its identity from top to bottom of the furnace in the initial charge, and from the top to the fluid contents of the hearth when the furnace is in operation, as in Figs. 1 and 2. Said coke passage $i$ is formed by a central circular wall at the top of the furnace, and this wall is supported, as shown in Fig. 3, by partition walls in the form of flying buttresses, arranged in pairs around said central wall, and forming between them where their inner edges are exposed below said circular wall, a wing-shaped passage, $i'$, in communication with said central passage $i$, above each of the main electrodes, $q$, $r$, $s$, and $t$, so that the coke may spread laterally in the form of wings between and below said partition walls, and extend the separation of the columns of coarse ore as hereinafter described. The other four of said hoppers, shown at $h$ in Figs. 1 and 4, and the peripheral passages, $l$, leading downward therefrom, are appropriated to the feed of resistance regulating material adapted to flow downward by gravity and to protect the main electrodes and regulate the conductivity of the charge at the heat zone as set forth in the previous specification hereinbefore referred to. I still prefer as such material broken electrode carbons reduced to suitable fragments so as to feed by gravity, which insures a regulating material of greater conductivity than the charge of coke or charcoal. To insure the discharge of said regulating material as required, the iron shell $b$ and its linings are provided with suitably capped stoke-holes, 4, Fig. 1, in communication with the working chamber $n$ beneath the several passages $l$, and so arranged as to facilitate pushing the regulating material inward over the main electrodes $q$, $r$, $s$, and $t$, respectively, from time to time as may be necessary. Said main electrodes $q$, $r$, $s$, and $t$, are preferably four in number and arranged in two pairs at right angles to each other and horizontal as aforesaid. They are located immediately above the hearth, $u$, and each of them in the specific construction shown in the drawings comprises a carbon body, 5, preferably built up of relatively small carbons, and securely united with ample electric contact to a metallic stem, 6, preferably of aluminum. Each of these electrode stems extends outward through a water-cooled stuffing box, 7, which is mounted on a face-plate, 8, covering an opening through which the body of the electrode may be introduced and withdrawn, and detachably secured to the iron shell $b$. Insulation against the leakage of electricity is introduced between the electrode stem and the gland of the stuffing box, and between the face-plate and iron shell, either or both.

Secondary electrodes, $v$ and $w$, are located respectively at the bottom and top of the furnace; the bottom electrode, $v$, having a carbon body, 9, which forms a lining for the hearth $u$ of the furnace, and is connected with a depending central metallic stem, 10, preferably in a peculiar manner which is illustrated by Figs. 12, 13 and 14. As here shown the electrode stem, 10, terminates at top in a large flat contact disk, 10', which is bolted to a contact-forming back plate 11 within the carbon body 9. Into this back plate 11, preliminarily, are cast fast the lower edges of upwardly extending clamp plates 12, of expanded plate-metal or the like, arranged in pairs, with sufficient space between the several pairs to admit, tightly, rectangular rod-carbon of suitable size. A layer of such rods, 13, is pressed into place in contact with the back plate 11, and pressed into effective contact therewith by metallic bars, 14, triangular in cross section, driven through the meshes of the expanded-metal. Another set of carbon rods, 15, is then placed between the clamp plates 11, upon said bars, 14; the spaces between the bars and clamp-plates being filled with packings, 16, of a suitable carbon cement composed of ground carbon and molasses; after which this structure, having said plate 11 as its base, is incorporated in the carbon lining of the hearth, as shown in Fig. 12, and the disk 10' of the stem 10 is bolted thereto. Suitable provision is made for cooling the electrode stem 10, as indicated by the water chamber 17, Fig. 12, within the disk 10' and the stem proper, and the water circulating pipes 18 and 19, the details of which may be of any known or improved description. The other electrode stems may obviously be cooled in like manner. Said electrode stem 10 protrudes through a water-cooled stuffing box, 20, mounted on a face plate, 21, which is bolted to the bottom of the furnace, so as to be detachable, and when detached exposes an opening, 22, through which the end disk 10' is introduced and withdrawn.

The secondary electrodes, $w$, at the top of the furnace, are preferably four in number, located above the respective main electrodes $q$, $r$, $s$ and $t$, and preferably of the peculiar construction represented by Figs. 8, 9, 10 and 11. As shown in these figures, the body of each of these top electrodes $w$ is composed mainly of carbon rods, 23, arranged vertically within a rectangular metallic holder, 24, one of the longer faces of which is open to expose the carbon body. Clamp plates, 25, of expanded metal, or the like, are cast fast within each holder 24 in pairs parallel to its sides. The carbon rods, 23, are placed within the holder, 24, layer upon layer, between said clamp plates, 25. The spaces between the rods are filled with packings, 26, of carbon cement; and the rods, 23, are held in place by the sides and lower end of the holder 24, and by becoming cemented into a solid composite mass. The metallic stem, 27, of each of these electrodes, is attached to the carbon holder, 24, and extends upward through a water-cooled stuffing box, 28, on the top plate $d$ as shown in Figs. 1 and 4, and in Fig. 8. Said bodies of the top electrodes $w$, or the top electrodes proper, including the carbon rods of each and their holders, are supported subjacently within rectangular pockets, 29, Figs. 1, 5 and 8, formed in the walls of the central coke passage $i$, so that the face of the carbon body of each of these electrodes is substantially flush with the inner surface of said wall, and in contact with the charge of coke through which the electric current passes from the bottom electrode $v$ to the top electrodes $w$; the latter being of one polarity.

The two sets of electrodes, that is to say the main electrodes, $q$, $r$, $s$, $t$, and the secondary electrodes, $v$, $w$, are preferably connected electrically with different dynamos; and the latter are preferably of the two-phase or alternating type, for the main electrodes at least. The bottom electrode $v$ forms the lining, as aforesaid, of a hearth $u$, which is made of ample capacity and is located immediately beneath the main electrodes $q$, $r$, $s$, and $t$, and provided with an outlet, 30, through which to run off the fluid metal, and an outlet, 31, at a higher point, for molten slag. The hearth portion of the furnace is suspended from an annular metallic sill, 32, which may rest upon columns or the like in customary manner, and the depending portion of the hearth is provided with a water jacket, 33, provided with suitably located inlet and outlet connections, 34 and 35, Fig. 1.

An annular gas chamber, 36, Fig. 1, etc., at the top of the furnace, communicates freely with the coarse-ore and coke passages, and with the intermediate passages for fine ore and regulating material, and discharges through an outlet pipe, 37, Figs. 1, 4 and 5.

For circulating the gases within the furnace, with reference to promoting the reduction of oxid iron ore in the manner hereinbefore described, the gas spaces $m$ formed within the several fine-ore sections of the furnace, as shown in Figs. 2, 3 and 6, communicate as already mentioned with tubes $o$. These tubes $o$ extend through the inner fine-ore passages ($k$) from the coarse-ore passages $j$, outward into curbs, 38, which project inward to such gas spaces $m$ from outside the furnace; and rotary blowers, 39, in the form of electric fans, are located within the outer ends of said tubes and driven by electric motors, $x$, attached to the iron shell $b$ of the furnace; the operation being to draw through the ore into said gas spaces $m$ the carbonic oxid gas, CO, formed at and in the vicinity of the heat zone, and to force the resulting carbonic acid, $CO_2$, through the coarse ore into the central column of hot coke, by which it is again reduced to carbonic oxid gas, so as to render possible the repetition of this reaction sufficiently to reduce the fine ore to a considerable extent as it escapes from beneath the baffle plates $p$, through the openings $p'$, on its way to the heat zone and before reaching the hottest part of the furnace. The blower tubes $o$ are so located as to keep the blowers $x^{39}$ from opposing one another, as represented in Figs. 3 and 15, which see. Those portions of the blower tubes $o$ extending through the inner fine-ore passages ($k$) operate as baffles, and supplement the baffle plates $p$.

The columns of coarse ore and coke within the working chamber of the furnace are separated initially at top by partitions formed as already indicated by flying buttresses sprung between the wall of the working chamber $n$ and the central circular wall within which the top electrodes $w$ are located. Compare Figs. 1, 2 and 3, and Fig. 6. The initial separation of the columns thus insured perpetuates itself downward, within the working chamber $n$, as indicated in Figs. 1 and 2, where the charge of the furnace is represented in the plane of section.

The regulating material descending by gravity through its passages $l$, as shown in Fig. 1, tends by its greater weight to feed itself beneath the superjacent wings of the coke column, upon and between the main electrodes, $q$, $r$, $s$, $t$, as shown in this figure; and the several streams may be manipulated, if desired, to increase or lessen their effect in regulating the operation of the furnace, by means of suitable stokers provided with insulated handles and introduced through the stoke holes 4, Fig. 1, before mentioned. The fire-ore passages $k$—$k'$ and gas spaces $m$, terminate at bottom in open ends within arched recesses, $y$, Figs. 2, etc., as clearly shown in Fig. 3. The fine ore thus released tends to fall inward to a greater or less extent as indicated in Fig. 2, and any particles which may enter with the gases into the gas spaces $m$ are immediately discharged therefrom so as to keep said spaces clear.

To insure the inward feed of the ore to a sufficient extent, suitable stoking means are provided beneath the several fine-ore passages $k$. Such means may consist of stoking screws, $z$ or $z^2$, Figs. 2, etc., and Fig. 21, as shown in the drawings. The fine ore, descending by gravity to the plane of these stoking screws $z$ or $z^2$, is there forced inward toward the heat zone, as represented in Fig. 2, carrying with it and intermingling with more or less of the coarse ore. The stoking screws $z$ are rotated for this purpose by means of worm gearing, 40, which may be driven by hand cranks or by electric motors. Compare Figs. 2, 3, 7, 16 and 17. The screws $z$ have their main bearings in water-cooled stuffing boxes, 41 and outer bearings within yokes, 42, attached to the face plates, 43, which support said stuffing boxes and between which and the iron shell $b$ water cooled frames 44, and ample insulation are interposed. Each of the screws is also constructed with a section, 45, of insulating material, interposed between the inner portion of the screw and its outer stem, 46, to prevent the passage of the electric current outward through the screws. The inlet and outlet water connections of each stuffing box, 41, and each water-cooled frame 44 are represented respectively in Figs. 16 and 17 at 47—48 and 49—50. The openings capped by the face-plates 43 and through which the stoking screws are inserted endwise into the furnace and withdrawn for renewal or repairs are represented at 51 in Fig. 16 and Fig. 21.

For the purpose of oxidizing fortuitous accumulations of carbon or other oxidizable materials at or in the proximity of the focus of the furnace, the inner and outer stems of the working screws shown at $z$ are provided with axial passages 52, Figs. 16 and 17, and the outer stems 46 are connected by swivel couplings 53, with hose or pipes, 54, through which air or other suitable oxidizing material may be blown into the center of the working chamber $n$ at will.

Separate twyers, $z'$, Fig. 21, may be provided additional to or in lieu of above provision for introducing oxidizing material through the stoking screws $z$; and, especially if such twyers be provided as substitutes for that provision, hollow-stemmed stoking screws, $z^2$, Fig. 21, may be employed, with water connections 55—56 for cooling them; suitable provision being made against any leakage of water or steam into the working chamber $n$. Either type of stoking screws may be horizontal as represented at $z$, or set at an angle so as to feed downwardly as represented at $z^2$, Fig. 21.

One or more man holes, 57, Figs. 2 and 3, suitably capped, and conveniently located beneath one or more of the stoking screws $z$, provide for entering the furnace after it is emptied and cooled for the renewal or repair of the electrodes and other like work, and may also be utilized in arranging the charge preliminarily. In preliminarily charging the furnace, the hearth $u$ is filled with coke, and a column of coke is built up within the working chamber $n$ surrounded by coarse ore to a sufficient height to insure the completion of a continuous coke column extending from the bottom electrode $v$ to a point more or less near the upper ends of the top electrodes $w$. Simultaneously, after the plane of the main electrodes, $q$, $r$, $s$, $t$, is reached, fine ore may be fed in through the fine-ore hoppers, $g$, until the fine-ore passages, $k$, $k'$, are filled or substantially filled. The passages, $l$, for regulating material, above the several main electrodes, $q$, $r$, $s$, $t$, may be filled at the same time or subsequently, and the streams of regulating material may be suitably directed over and in contact with the main electrodes, as shown in Fig. 1.

The electric current is turned on, first through the secondary electrodes $v$ and $w$, as illustrated diagrammatically by Fig. 18, and through the intervening column of coke, which is thus rendered incandescent. The current is then turned on through the main electrodes, $q$, $r$, $s$, $t$, and its supply to both sets from different dynamos as aforesaid, may be simultaneous as illustrated diagrammatically by Fig. 19. The current may thus be passed through the charge by way of all the electrodes throughout the reducing operation, or the secondary electrodes, $v$—$w$, may be used only occasionally as required. The gas circulating blowers, $x^{30}$, are started as soon as the coke column is incandescent, so as to insure the conversion of the carbonic-oxid gas formed in the vicinity of the heat zone into carbonic acid, and the conversion of the latter into carbonic-oxid gas again, and so on alternately as above described. Suitable fluxes are added to the several columns of ore and possibly to the coke, as may be required, and the supply of materials by way of the several hoppers, $e$, $f$, $g$, $h$, at the top of the furnace, is kept up so as to render the operation of the furnace substantially continuous.

Stoking at the stoke holes 4, Fig. 1, is resorted to occasionally as may be required to render the operation of the main electrodes, $q$, $r$, $s$, $t$, substantially uniform; and the stoking screws $z$ or $z^2$ are operated from time to time as may be required to regulate the feed of the fine ore inward to the heat zone. The fluid metal is run off from time to time or continuously through the tap hole, 30, Fig. 1, and the molten slag through its outlet 31, Fig. 1. The discharge of gas through the pipe 37 at the top of the furnace may be continuous, and may, if desired, be promoted by an exhaust fan; the gas being stored, for use in engines or otherwise, in known or improved ways.

The electric connections may include suitable switches for varying the flow of the current through the main electrodes, $q$, $r$, $s$, $t$, as illustrated by Fig. 12 of my drawings forming part of United States Patent No. 702,117, dated June 10, 1902; and in like manner provision may be made for disconnecting the main electrodes from their normal source of supply and throwing them into circuit with the bottom electrode $v$, as illustrated by Fig. 20, in order to melt out the contents of the hearth $u$ after temporarily suspending the operation.

Suitable carbonaceous material will in most cases be mixed with the ore, and other mixtures may obviously be fed into the working chamber through the several hoppers at the top of the furnace to produce alloys or otherwise to regulate or vary the product of the furnace. For example, large pieces or chunks of electrode carbon may be fed into the central hopper $e$ occasionally or systematically, so as to become parts of the coke column and to feed slowly downward therein, with reference to their accumulation to a sufficient extent between the main electrodes, $q$, $r$, $s$, $t$, to hold back one or more of the materials for reduction, and to insure proper conductivity without obstructing the trickling of streams of the molten metal downward between the electrodes into the hearth. Instead of being strictly horizontal as shown, the main electrodes, $q$, $r$, $s$, $t$, may be inclined at any angle found practicable or necessary to their best operation. Such inclined electrodes, being in all cases more nearly horizontal than vertical, are intended to be included in the terms "horizontal electrodes", and "horizontal main electrodes".

In partial embodiments of the invention the main electrodes may also be confined to one pair, or any number of pairs may be used.

The hearth (*u*) may be shallow and inclined, so as to allow the reduced metal and slag to flow continuously from the furnace into an outside settling chamber, there to complete their separation from each other, as is common practice in ordinary copper and lead smelting furnaces.

In practice all the electrode stems will be water cooled in substantially the manner shown at 17, 18 and 19 in Fig. 12; and the face plates 8 and 21, or the former at least, will be separated from the iron shell *b* by water-frames substantially as shown at 44, 49 and 50 in Fig. 16.

Other stoking means may obviously be employed in place of the stoking screws above described; and other like modifications will suggest themselves to those skilled in the art.

Having thus described said improvement, I claim as my invention, and desire to patent under this specification:

1. In an electric smelting furnace having horizontal electrodes and a body of stack form containing a working chamber into which said electrodes extend, and provided with a central flue-shaped feed passage extending vertically downward toward the plane of said electrodes and like feed passages extending downward around said central passage toward the same plane, the combination of a top plate constructed with feed openings in communication with said passages respectively, and superposed hoppers the walls of which are constructed and rigidly connected with each other and with said top plate to form trusses to stiffen and support said top plate.

2. An electric smelting furnace having, in combination, horizontal electrodes, and a body of stack form containing a central working chamber into which said electrodes extend, a central flue-shaped passage above said working chamber, wing forming passages adjoining said central passage and feed passages surrounding said central passage and separated from each other by said wing forming passages, said passages discharging in common into said working chamber above said electrodes.

3. An electric smelting furnace having, in combination, horizontal electrodes, and a body of stack form containing a central working chamber into which said electrodes extend, a central flue-shaped coke passage extending vertically downward toward the plane of said electrodes, coarse ore and fine ore passages extending downward around the same, and means for gradually mixing the fine ore with the coarse ore on its way to the heat zone.

4. An electric smelting furnace having, in combination, horizontal electrodes, and a body of stack form containing a central working chamber into which said electrodes extend, a central flue-shaped coke passage extending vertically downward toward the plane of said electrodes, coarse ore passages extending downward around said coke passage and fine ore passages external to said coarse ore passages, whereby outwardly directed heat is intercepted and utilized for heating fine ore.

5. An electric smelting furnace having, in combination, horizontal electrodes, a suitably lined metallic shell through which said electrodes extend inward and which incloses the working chamber, and an inner structure of brick or the like forming a central flue-shaped coke passage, coarse-ore passages extending downward around the same and fine-ore passages external to said coarse-ore passages within said shell, whereby outwardly directed heat is intercepted and utilized for heating the fine ore.

6. An electric smelting furnace having, in combination, horizontal electrodes, a suitably lined metallic shell through which said electrodes extend inward and which incloses the working chamber, and an inner structure of brick or the like forming a central flue-shaped coke passage, coarse-ore passages extending downward around the same, fine-ore passages external to said coarse-ore passages and means for gradually mixing the fine ore with the coarse ore on its way to the heat zone.

7. An electric smelting furnace having, in combination, horizontal electrodes, a suitably lined metallic shell through which said electrodes extend inward and which incloses the working chamber, and an inner structure of brick or the like forming a central flue-shaped coke passage, coarse-ore passages extending downward around the same, fine-ore passages external to said coarse ore passages within said shell, and an inner wall forming the wall of the working chamber and provided with openings through which the fine ore may flow gradually into the working chamber and become mixed with the coarse ore.

8. An electric smelting furnace having, in combination, horizontal electrodes, a suitably lined metallic shell through which said electrodes extend inward and which incloses the working chamber, and an inner structure of brick or the like forming a central flue-shaped coke passage, coarse-ore passages extending downward around the same, fine-ore passages external to but adjoining said coarse-ore passages and communicating therewith at intervals for the gradual admixture of the fine ore with the coarse ore, and peripheral fine-ore passages discharging at bottom into the working chamber, whereby a relatively solid body of fine ore is arranged immediately within said shell for the interception and utilization of outwardly directed heat.

9. An electric smelting furnace having, in combination, horizontal electrodes, a suitably lined metallic shell through which said electrodes extend inward and which incloses the working chamber, and an inner structure of brick or the like forming a central flue-shaped coke passage, passages arranged to form wings of the coke column above the respective electrodes, and ore passages separated by said wing-forming passages, said passages in common communicating with the working chamber at bottom and adapted to feed material downward by gravity.

10. An electric smelting furnace having, in combination, horizontal electrodes, a suitably lined metallic shell through which said electrodes extend inward and which incloses the working chamber, and an inner structure of brick or the like forming a central flue-shaped coke passage, passages arranged to form wings of the coke column above the respective electrodes, and ore passages separated by said wing-forming passages, said passages in common communicating with the working chamber at bottom and adapted to feed the materials downward by gravity, and passages for resistance-regulating material external to said wing-forming passages discharging downward upon the respective electrodes.

11. An electric smelting furnace having, in combination, horizontal electrodes, a suitably lined metallic shell through which said electrodes extend inward and which incloses the working chamber, an inner structure of brick or the like forming a central flue-shaped coke passage, coarse-ore passages extending downward around the same and fine-ore passages external to said coarse-ore passages within said shell, and means for stoking the fine ore beneath said fine-ore passages and above the plane of said electrodes.

12. An electric smelting furnace having, in combination, horizontal electrodes, a suitably lined metallic shell through which said electrodes extend inward and which incloses the working chamber, an inner structure of brick or the like forming a central flue-shaped coke passage, coarse-ore passages extending downward around the same and fine-ore passages external to said coarse-ore passages within said shell, stoking screws extending inward beneath said fine-ore passages and above the plane of said electrodes, and means for supporting and rotating said stoking screws attached to the shell of the furnace.

13. An electric smelting furnace having, in combination, horizontal electrodes, a suitably lined metallic shell through which said electrodes extend inward and which incloses the working chamber, an inner structure of brick or the like forming a central flue-shaped coke passage, coarse-ore passages extending downward around the same and fine-ore passages external to said coarse-ore passages within said shell, stoking screws extending inward beneath said fine-ore passages and above the plane of said electrodes and adapted for the introduction of oxidizing material therethrough into the center of the working chamber, and means for supporting and rotating said stoking screws attached to the shell of the furnace.

14. An electric smelting furnace having, in combination, horizontal electrodes, a suitably lined metallic shell through which said electrodes extend inward and which incloses the working chamber, an inner structure of brick or the like forming a central flue-shaped coke passage, coarse-ore passages extending downward around the same and fine-ore passages external to said coarse-ore passages within said shell, stoking screws extending inward beneath said fine-ore passages and above the plane of the electrodes and constructed with axial passages within their stems, pipes connected with the outer ends of said stems by swivel couplings for the introduction therethrough of oxidizing material, and means for supporting and rotating said stoking screws attached to the shell of the furnace.

15. An electric smelting furnace having, in combination, horizontal electrodes, a body of stack form containing the working chamber into which said electrodes extend and provided with a central flue-shaped coke passage and with flue-shaped coarse-ore and fine-ore passages surrounding said coke passage within the upper part of said body through which the materials for the charge may flow continuously downward toward the plane of said electrodes, and a subjacent hearth adapted for the discharge of the metal and slag in fluid condition.

16. An electric smelting furnace having, in combination, horizontal electrodes, a body of stack form containing the working chamber into which said electrodes extend and provided with a central flue-shaped coke passage and with flue-shaped coarse-ore and fine-ore passages surrounding said coke passage within the upper part of said body through which the materials for the charge may flow continuously downward toward the plane of said electrodes, and a subjacent water-jacketed hearth provided with a tap hole and a slag outlet.

17. An electric smelting furnace having, in combination, horizontal electrodes, a body of stack form containing a central working chamber into which said electrodes extend and provided with a central flue-shaped feed passage and feed passages on all sides around said central passage within the upper part of said body through which the materials for the charge may flow continuously downward toward the plane of said electrodes, a subjacent hearth adapted for the discharge of the metal and slag in fluid condition, an annular gas chamber at the top of the furnace in communication with the passages last named, and a pipe leading therefrom for the utilization of the gaseous by-product.

18. An electric smelting furnace having, in combination, horizontal electrodes, a body of stack form containing a central working chamber into which said electrodes extend and provided with a central vertical coke passage within the upper part of said body, coarse-ore passages extending downward around said coke passage and fine-ore passages extending downward external to said coarse-ore passages, said passages discharging in common within said working chamber, a subjacent hearth adapted for the discharge of the metal and slag in fluid condition, an annular gas chamber at the top of the furnace in communication with said coarse-ore passages and said fine-ore passages, and a pipe leading therefrom for the utilization of the gaseous by-products.

19. An electric smelting furnace having, in combination, horizontal electrodes, a body of stack form containing a central working chamber into which said electrodes extend and provided with a central vertical coke passage, passages forming wings of said coke passage above the several electrodes, passages external to said wing forming passages for feeding resistance regulating material and ore passages at the sides of said wing forming passages and passages for resistance regulating material, a subjacent hearth adapted for the discharge of the metal and slag in fluid condition, an annular gas chamber at the top of the furnace in communication with said ore passages and with said wing forming passages and passages for resistance regulating material, and a pipe leading therefrom for the utilization of the gaseous by-product.

20. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, means for supplying the respective quarters with ore fed by gravity, and means for maintaining a central gravity-fed coke column within the working chamber.

21. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, means for supplying the respective quarters with coarse ore fed by gravity, means for mixing therewith fine ore fed independently toward the heat zone by gravity, and means for maintaining a central gravity-fed coke column within the working chamber.

22. An electric smelting furnace of the stack type having, in combination, a suitable shell inclosing the working chamber, horizontal electrodes extending inward through said shell, means for supplying the working chamber with ore fed by gravity in the form of columns at the sides of the several electrodes, and means for separating the columns of ore including inner walls forming a central vertical coke passage and laterally extending wings of the same extending downward between the ore columns.

23. An electric smelting furnace of the stack type having, in combination, a suitable shell inclosing the working chamber, horizontal electrodes extending inward through said shell and arranged in two pairs at right angles to each other, and means for feeding materials for the reaction in the form of a coke column cruciform in cross section with ore columns in its reëntrant angles.

24. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, means for supplying the respective quarters with ore fed by gravity, and means for separating the columns of ore including inner walls forming a central vertical coke passage and laterally extending wings of the same extending downward between the ore columns.

25. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, means for supplying the respective quarters with ore fed by gravity in the form of flue-shaped passages within the upper part of the shell, a central coke passage, passages forming wings of the coke column above the several electrodes, and passages nearer the shell through which resistance-regulating material may be fed downward upon and between the electrodes.

26. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, and walls within the upper part of said shell forming flue-shaped passages for supplying the respective quarters with ore fed by gravity and walls forming a central coke passage and wing-shaped coke passages above the several electrodes, the walls forming said central and wing-shaped passages serving to sparate the ore columns in the upper part of the furnace and to insure their separation to a sufficient extent below said walls by the coke column and its wings.

27. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, and inner walls within the upper part of the shell forming flue-shaped passages for the supply of the respective quarters with ore fed by gravity, a central coke passage, wing-shaped coke passages adjoining said central passage and passages between said wing-shaped passages and the shell through which resistance-regulating material may be fed downward upon and between the electrodes.

28. An electric smelting furnace of the stack type having, in combination, a suitable shell inclosing the working chamber, horizontal electrodes extending inward through said shell and arranged in two pairs at right angles to each other, means for passing a two-phase current through the respective pairs of electrodes and thus dividing the working chamber into quarters, means for supplying the respective quarters with ore fed by gravity including walls forming flue-shaped passages within the upper part of the shell, and walls forming a central coke passage, passages forming wings of the coke column above the several electrodes, and passages nearer the shell through which resistance-regulating material may be fed downward upon and between the electrodes; said shell being provided with stoke holes above the several electrodes in communication with the working chamber beneath the passages last named.

29. An electric smelting furnace of the stack type having, in combination, a suitable shell inclosing the working chamber, horizontal main electrodes extending inward through the sides of said shell, secondary electrodes located respectively at its top and bottom, and means for feeding the material for the charge including inner walls forming a flue-shaped coke passage through which a column of carbonaceous material is fed downward to form a resistance conductor between said secondary electrodes.

30. An electric smelting furnace of the stack type having, in combination, a suitable shell inclosing the working chamber, horizontal main electrodes extending inward through the sides of said shell, secondary electrodes located respectively at its top and bottom, and means for feeding the material for the charge including inner walls forming a flue-shaped coke passage through which a column of carbonaceous material is fed downward to form a resistance conductor between said secondary electrodes and walls forming downwardly extending ore passages separated from each other by said coke passage.

31. An electric smelting furnace of the stack type having, in combination, a suitable shell inclosing the working chamber, horizontal main electrodes extending inward through the sides of said shell, secondary electrodes located respectively at its top and bottom, and means for feeding the material for the charge including inner walls forming a central flue-shaped coke passage through which a column of carbonaceous material is fed downward to form a resistance conductor between said secondary electrodes and walls forming downward extending passages for coarse and fine ore respectively, located at the sides of said coke passage, the fine ore passages being arranged outermost for the conservation of outwardly directed heat.

32. An electric smelting furnace of the stack type having, in combination, a suitable shell inclosing the working chamber, horizontal main electrodes extending inward through the sides of said shell, secondary electrodes located respectively at its top and bottom, and means for feeding the material for the charge including inner walls forming a central flue-shaped coke passage through which a column of carbonaceous material is fed downward to form a resistance conductor between said secondary electrodes, said secondary electrodes at the top of the furnace being arranged at the sides of said coke passage and exposed to contact with the material within said passage.

33. An electric smelting furnace of the stack type having, in combination, a suitable shell inclosing the working chamber, horizontal main electrodes extending inward through the sides of said shell, secondary electrodes located respectively at its top and bottom, and means for feeding the material for the charge including inner walls forming a central flue-shaped coke passage through which a column of carbonaceous material is fed downward to form a resistance conductor between said secondary electrodes, said secondary electrodes including a plurality of electrodes of one and the same polarity at the top of the furnace exposed to contact with the material within said coke passage.

34. An electric smelting furnace having, in combination, horizontal main electrodes, a suitably lined metallic shell through which said electrodes extend inward and which incloses the working chamber, an inner structure of brick or the like forming a central flue-shaped coke passage provided with recesses open toward the interior of the passage, secondary electrodes supported within said recesses and exposing their contact surfaces to contact with the material within said coke passage, and means for feeding in the material for reduction at the sides of the coke column.

35. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, and a secondary electrode at the bottom of said hearth.

36. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, a secondary electrode at the bottom of said hearth, and secondary electrodes at the top of the furnace arranged to contact with the material within said coke passage.

37. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the heat zone, a subjacent hearth, a secondary electrode at the bottom of said hearth, and secondary electrodes at the top of the furnace arranged to contact with the material within said coke passage; said ore passages including separate coarse-ore and fine-ore passages, the latter arranged peripherally for the interception of outwardly directed heat.

38. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, a secondary electrode at the bottom of said hearth, and secondary electrodes at the top of the furnace arranged to contact with the material within said coke passage; said ore passages including separate coarse-ore and fine-ore passages, the latter outermost, and said walls forming gas spaces external to said fine-ore passages and in communication with the center of the furnace by way of said coarse-ore passages.

39. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, a secondary electrode at the bottom of said hearth and secondary electrodes at the top of the furnace arranged to contact with the material within said coke passage, said ore passages including separate coarse-ore and fine-ore passages, the latter outermost, and said walls forming gas spaces external to said fine-ore passages and in communication with the center of the furnace by way of said coarse-ore passages, and a gas chamber and discharge at the top of the furnace in communication with said gas spaces.

40. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, a secondary electrode at the bottom of said hearth and secondary electrodes at the top of the furnace arranged to contact with the material within said coke passage, said ore passages including separate coarse-ore and fine-ore passages, the latter outermost, and said walls forming gas spaces external to said fine-ore passages and in communication with the center of the furnace by way of said coarse-ore passages, and means for effecting a forced circulation of gases within the furnace from the incandescent coke column to said gas spaces through the intervening columns of ore and back again into the incandescent coke column.

41. An electric smelting furnace of the stack type having, in combination, a suitable shell inclosing the working chamber, horizontal main electrodes extending inward through said shell, means for feeding the material for the charge including hoppers on the top of the furnace and inner walls forming a central flue-shaped coke passage and flue-shaped ore passages at the sides of said coke passage, in communication with said hoppers, discharging by gravity within the working chamber, a subjacent hearth, a secondary electrode at the bottom of said hearth and secondary electrodes at the top of the furnace arranged to contact with the material within said coke passage, said ore passages including separate coarse-ore and fine-ore passages, the latter outermost, and said walls forming gas spaces external to said fine-ore passages and in communication with the center of the furnace by way of said coarse-ore passages, a gas chamber and discharge at the top of the furnace in communication with said gas spaces, and means for effecting a forced circulation of gases within the furnace from the incandescent coke column to said gas spaces through the intervening columns of ore and back again into the incandescent coke column, said means including blowers at the periphery of the furnace and tubes extending inward therefrom and in communication with said gas spaces at their outer ends.

42. An electric smelting furnace of the stack type having, in combination, horizontal electrodes, a suitably lined metallic shell through which said electrodes extend inward and which incloses the working chamber, an inner structure of brick or the like forming a central flue-shaped coke passage, coarse-ore passages extending downward around said coke passage and fine-ore passages external to but adjoining said coarse-ore passages and communicating therewith at intervals for the gradual admixture of the fine ore with the coarse ore, and baffle plates within said fine-ore passages arranged immediately above the several points of intercommunication.

43. An electric smelting furnace of the stack type having, in combination, horizontal electrodes, a suitably lined metallic shell through which said electrodes extend inward and which incloses the working chamber, and an inner structure of brick or the like forming a central flue-shaped coke passage, coarse-ore passages extending downward at the sides of said coke passage, fine-ore passages external to said coarse-ore passages and gas spaces external to said fine-ore passages and in communication with both.

44. An electric smelting furnace of the stack type having, in combination, horizontal electrodes, a suitably lined metallic shell through which said electrodes extend inward and which incloses the working chamber, an inner structure of brick or the like forming a central flue-shaped coke passage, coarse-ore passages extending downward at the sides of said coke passage, fine-ore passages external to said coarse-ore passages and gas spaces external to said fine-ore passages and in communication with both, and baffle plates within said fine-ore passages arranged immediately above the several points of intercommunication.

45. An electric smelting furnace of the stack type having, in combination, horizontal electrodes, a suitably lined metallic shell through which said electrodes extend inward and which incloses the working chamber, an inner structure of brick or the like forming a central flue-shaped coke passage, coarse-ore passages extending downward at the sides of said coke passage, fine-ore passages external to said coarse-ore passages, gas spaces external to said fine-ore passages and in communication with both, and baffle plates within said fine-ore passages arranged immediately above the several points of intercommunication, said baffle plates being V-shaped in cross section and arranged with the apex uppermost.

46. An electric smelting furnace of the stack type having, in combination, horizontal main electrodes, a suitably lined metallic shell through which said electrodes extend inward and which incloses the working chamber, an inner structure of brick or the like forming a central flue-shaped coke passage, coarse-ore passages extending downward at the sides of said coke passage, fine-ore passages external to said coarse-ore passages, and gas spaces external to said fine-ore passages and in communication with both, secondary electrodes arranged at the top and bottom of the furnace and operating to extend the heat zone upward within the coke column, and means for circulating the gases within the furnace back and forth between the incandescent coke column and said gas spaces through the ore columns.

47. An electric smelting furnace of the stack type having, in combination, horizontal main electrodes, a suitably lined metallic shell through which said electrodes extend inward and which incloses the working chamber, an inner structure of brick or the like forming a central flue-shaped coke passage, coarse-ore passages extending downward at the sides of said coke passage, fine-ore passages external to said coarse-ore passages and gas spaces external to said fine-ore passages and in communication with both, secondary electrodes arranged at the top and bottom of the furnace and operating to extend the heat zone upward within the coke column, and means for circulating the gases within the furnace back and forth between the incandescent coke column and said gas spaces through the ore columns, said means including peripherally arranged blowers and inwardly extending tubes interacting with said blowers and in communication with said gas spaces and said working chamber at their respective ends.

48. In an electric smelting furnace of the stack type, the combination with a suitably insulated metallic shell and top plate, and with an inner structure of brick or the like forming a flue-shaped coke passage within the top of the furnace, of a stuffing box upon said top plate, an electrode stem extending downward through said stuffing box, and an electrode including a metallic frame attached to said stem and a carbon body supported by said frame and exposed to contact with the carbonaceous material within said passage.

49. In an electric smelting furnace of the stack type, the combination with a suitably insulated metallic shell and top plate and with an inner structure of brick or the like forming a flue-shaped coke passage within the top of the furnace having a recess in its wall opening inward, of a stuffing box upon said top plate, an electrode stem extending downward through said stuffing box, and an electrode supported within said recess including a metallic frame attached to said stem and a carbon body supported by said frame and exposed to contact with the carbonaceous material within said passage.

50. In an electric smelting furnace of the stack type, the combination with a suitably insulated metallic shell and top plate and with an inner structure of brick or the like forming a flue-shaped coke passage within the top of the furnace, of a stuffing box upon said top plate, an electrode stem extending downward through said stuffing box, and an electrode including a box-shaped metallic support attached to said stem and a carbon body within said support and exposed to contact with the carbonaceous material within said passage.

51. In an electric smelting furnace of the stack type, the combination with a suitably insulated metallic shell and top plate, and with an inner structure of brick or the like forming a flue-shaped coke passage within the top of the furnace, of a stuffing box upon said top plate, an electrode stem extending downward through said stuffing box, and an electrode including a box-shaped metallic support attached to said stem and having yielding contact plates of expanded metal or the like fast at one edge in its back and carbon rods packed between said contact plates and cemented thereto and to each other, the contact face of the electrode as a whole being exposed to contact with the carbonaceous material within said passage.

52. In an electric smelting furnace of the stack type, the combination with a suitably insulated metallic shell and top plate, and with an inner structure of brick or the like forming a central flue-shaped coke passage within the top of the furnace having recesses in its walls, opening inward, of a central hopper upon said top plate in communication with said passage, stuffing boxes upon said top plate surrounding said hopper, electrode stems extending downward through said stuffing boxes, and electrodes attached to said stems supported within said recesses and exposed to contact with the carbonaceous material within said passage.

53. In an electric smelting furnace of the stack type, the combination with a suitably insulated metallic shell and top plate, and with an inner structure of brick or the like forming a central flue-shaped coke passage within the top of the furnace having recesses in its walls opening inward, of a central hopper upon said top plate in communication with said passage, stuffing boxes upon said top plate surrounding said hopper, electrode stems extending downward through said stuffing boxes, electrodes of one and the same polarity attached to said stems supported within said recesses and exposed to contact with the carbonaceous material within said passage, and an electrode of opposite polarity at the bottom of the furnace.

54. In an electric smelting furnace, the combination with the hearth of the furnace of a stuffing box attached to the bottom of the hearth, an electrode stem extending upward through said stuffing box and having a contact disk at its upper end, and an electrode within the hearth comprising a metallic back plate, yielding contact plates of expanded metal or the like fast at their lower edges within said back plate, carbon rods tightly filling the spaces between said contact plates and cemented thereto and to each other, and a molded carbon body within which said back plate and the parts attached thereto are embedded.

55. In an electric smelting furnace, the combination with the hearth of the furnace of a stuffing box attached to the bottom of the hearth, an electrode stem extending upward through said stuffing box and having a contact disk at its upper end, and an electrode within the hearth comprising a metallic back plate, yielding contact plates of expanded metal or the like arranged in the form of vertical walls and double partitions fast at their lower edges in said back plate, carbon rods fitting tightly between opposing pairs of said contact plates and cemented thereto and to each other, and a molded carbon body within which said back plate and the parts attached thereto are embedded.

56. In an electric smelting furnace, the combination with the hearth of the furnace of a stuffing box attached to the bottom of the hearth, an electrode stem extending upward through said stuffing box and having a contact disk at its upper end, and an electrode within the hearth comprising a metallic back plate, contact plates of expanded metal or the like forming vertical walls and double partitions fast at their lower edges in said back plate, a layer of carbon rods parallel with said contact plates in contact therewith and with said back plate, metallic rods at right angles to said carbon rods interacting with the openings in said contact plates and serving to hold said carbon rods in close contact with said back plate, and a molded carbon body within which said back plate and the parts attached thereto are embedded.

57. In an electric smelting furnace, the combination with the hearth of the furnace of a stuffing box attached to the bottom of the hearth, an electrode stem extending upward through said stuffing box, and an electrode within the hearth comprising a metallic back plate, contact plates of expanded metal or the like forming vertical walls and double partitions fast at their lower edges in said back plate, a layer of carbon rods parallel with said contact plates, in contact therewith and with said back plate, metallic rods at right angles to said carbon rods interacting with the openings in said plates and serving to hold said carbon rods in close contact with said back plate, an additional layer of carbon rods crossing said metallic rods between said contact plates and cemented thereto and to said plates and rods and to each other, and a molded carbon body within which said back plate and the parts attached thereto are embedded.

58. In an electric smelting furnace, the combination with a suitably lined metallic shell having a stem admitting opening and with suitable connections of a metallic face plate capping said opening and a water cooled frame and suitable insulation interposed between said plate and said shell.

59. In an electric smelting furnace, the combination with a suitably lined metallic shell having an electrode admitting opening and with suitable connections for water and electricity of a metallic face plate capping said opening and constructed with a water cooled stuffing box, and a water cooled frame and suitable insulation interposed between said plate and said shell.

60. In an electric smelting furnace, the combination with a suitably lined metallic shell provided with a water jacket for the hearth of the furnace, and having an electrode admitting opening in said shell and water jacket at its bottom, of an electrode within the hearth constructed with a metallic contact plate at its bottom above said opening, a water cooled electrode stem constructed with a hollow water cooled contact disk at its inner end insertible and removable through said opening and attached to said back plate of the electrode, and a cap plate attached externally to said shell to close said opening and constructed with a water cooled stuffing box through which said stem extends outward, substantially as hereinbefore specified.

EDWARD R. TAYLOR.

Witnesses:
C. N. McFARREN,
S. A. McDONALD.